Figures 1, 2:
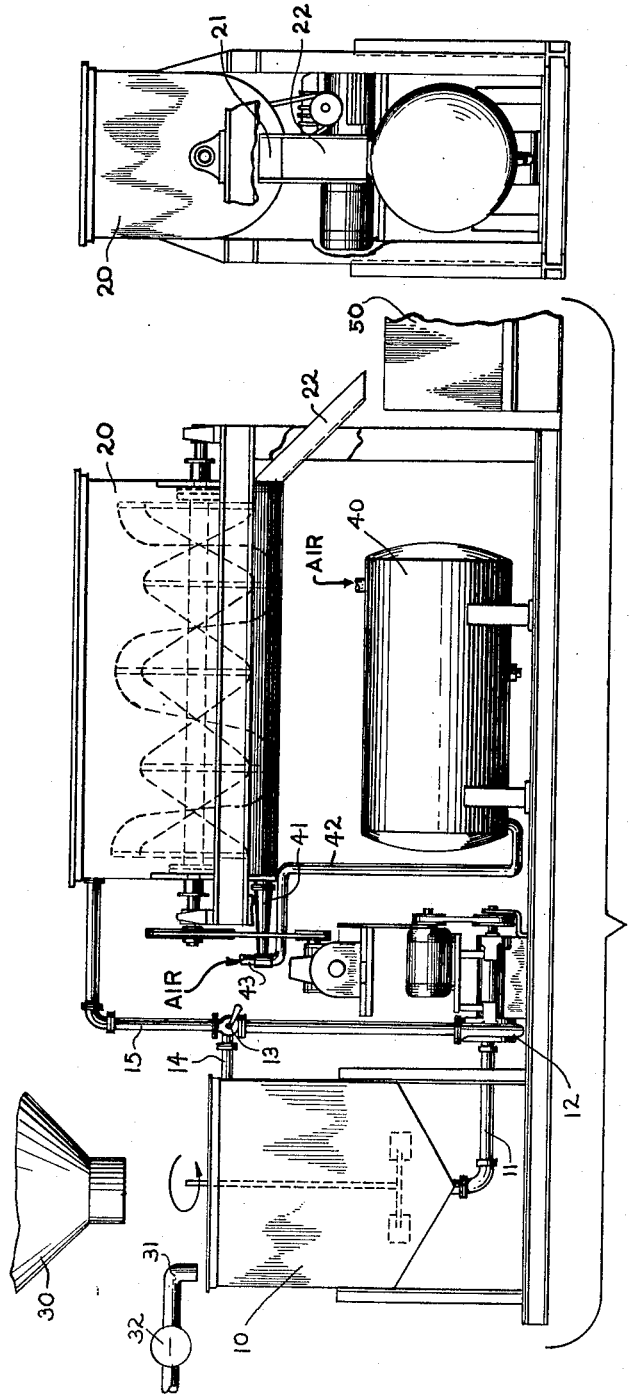

April 6, 1965

H. UMANSKY 3,177,281

METHOD OF CASTING CELLULAR CONCRETE

Filed March 5, 1962

INVENTOR.
HAROLD UMANSKY

3,177,281
METHOD OF CASTING CELLULAR CONCRETE
Harold Umansky, Toledo, Ohio, assignor to Owens-Illinois Glass Company, a corporation of Ohio
Filed Mar. 5, 1962, Ser. No. 177,447
5 Claims. (Cl. 264—299)

The present invention relates to an improved method of casting or molding cellular concrete and more particularly to a method of eliminating planes of weakness or pour folds in the casting or molding of cellular concrete.

Cellular concrete is generally formed by mixing cement, silica flour, lime and water to form a cementitious slurry. A cellular structure in the cementitious slurry can be achieved by several conventional means, one of which includes the use of preformed foam. Preformed foam is blended into the slurry to obtain a cellular casting mixture of the desired density. The casting mixture is then poured or pumped into a mold to form a cast or molded body. The molded body is allowed to preharden to a self-supporting state and is then wire sliced into a plurality of slabs. The slabs are placed in an autoclave and cured or indurated under heat and pressure. The general process for forming cellular concrete using a preformed foam and typical apparatus for molding material is described in United States Patent No. 2,979,801 to R. C. Gasmire.

In the conventional method of casting cellular concrete, planes of weakness appear in the molded body after it has set to a self-supporting consistency. These planes of weakness are commonly referred to as "pour folds." The reason for these planes of weakness for pour folds has heretofore been unknown and likewise a method for their elimination has been unknown. Pour folds seriously reduce the ultimate strength of the structural slabs and consequently limit the applications for which they are suitable or useful. Pour folds also cause difficulties in the wire slicing of molded cellular concrete bodies in that the stresses created by the slicing wires tend to break apart the bodies at the planes of weakness or pour folds, thereby creating a great deal of scrap material.

Accordingly, it is an important object of the present invention to provide a method for eliminating pour folds in the casting of cellular concrete.

Other objects and advantages of this invention will become apparent from the following description taken in conjunction with the accompanying drawings wherein are set forth, by way of illustration and example, the preferred embodiments of this invention.

In the drawings:

FIG. 1 is a schematic view showing the apparatus used to practice my invention; and FIG. 2 is a schematic end view of the apparatus used to practice the method of this invention.

The object of the present invention is obtained by flowing the cellular concrete casting mixture from the last mixing or blending station through an open channel to the mold at a velocity sufficient to maintain turbulent flow.

Briefly, the apparatus used to practice my invention, as shown on FIG. 1, comprises a conventional high shear or turbine type mixer 10, and a conventional paddle wheel or ribbon type blender 20 which is elevated. Solids in the proper portions are dumped into a hopper 30 and are then fed from the hopper 30 to the turbine mixer 10. Water is supplied from a water supply line 31 having a volumetric water meter 32 for metering out a desired volume of water. A section of piping 11 leads from the discharge orifice of the mixer 10 to the input side of a conventional pump 12 suitable for pumping abrasive material. The slurry from the mixer 10 is pumped to a three-way valve 13 which is adjustable to recirculate the slurry back into the mixer 10 through a section of piping 14, or to direct the slurry to the blender 20 through piping 15. The preformed foam supply system comprises a foam solution supply tank 40, a foam nozzle 41, a source of air under pressure, and suitable piping. The foam nozzle 41, which is preferably of the type described in United States Patent No. 2,864,714 to J. S. Dixon et al., has its input end connected to the solution tank 40 through tubing 42 and also connected to a source of pressurized air through tubing 43. The foam solution in the tank 40 is maintained under pressure (as indicated on FIG. 1) to supply it to the foam forming nozzle. The discharge end of the foam nozzle 41 communicates with the interior of the blender 20. The discharge end of the blender has a slide gate 21 and a discharge chute 22. The blender 20 and its associated discharge chute 22 are elevated sufficiently to allow the material to discharge into a mold 50.

The solids or cementitious ingredients are preferably cement of the Portland type, either normal or of the high early strength type, and lime, preferably quick lime, although a high calcium hydrate of lime may be utilized. Any pozzolanic material may be utilized, a pozzolan being defined as a finely divided material rich in silica or alumina which, while not necessarily cementitious in itself, will react with hydrated lime in the presence of water to form insoluble cementitious products. The preferred pozzolan is silica flour, although ground silica sand, burned oil-shell, fly ash, ground brick or tile, volcanic ash, granulated slag, diatomaceous earth, pumice dust, glass grinding waste, or other suitable pozzolans may be utilized.

The preferred foam utilized in the practice of this invention is formed by combining pressurized air and a foaming solution in the aforementioned foam forming nozzle 41. Foaming agents of the following type may be used: detergents, resin soap, saponin, alkylated naphthalene, sulphonates, neutralized synthetic resins or hydrolyzed protein, or commercial foaming liquids, such as National Foam HT-1 manufactured by National Foam Systems, Inc., of West Chester, Pennsylvania.

To form a typical cementitious slurry for use in forming cellular concrete, the following composition of solids may be utilized:

|  | Percent |
|---|---|
| High early cement | 30 |
| Silica flour | 65 |
| Quicklime | 5 |

Calcium chloride may be added as an accelerator, preferably to an extent equal to about 2% by weight of the cement content of the slurry dry ingredients.

A batch having the proper amount of cementitious ingredients is discharged from the hopper 30 into the high shear mixer 10. A sufficient amount of water to yield a water-to-solids ratio of about 0.5 by weight is metered into the mixer. The mixer is energized and the solids and water violently mixed to form a cementitious slurry having a wet density of about one hundred pounds per cubic foot. The three-way valve 13 is positioned to recirculate the slurry from the pump back into the mixer until such time as it is desired to start the blending cycle. The recirculation aids in creating a uniform slurry. At the desired time the three-way valve is turned to allow the slurry to be pumped into the blender, which is rotating at a relatively slow speed, such as 30 r.p.m. At approximately the same time, foaming solution and air under pressure are admitted to the foam nozzle 41. A commercial foaming agent sold under the trade name "National Foam Liquid" manufactured by National Foam Systems, Inc., of West Chester, Pennsylvania, and consisting of a 2½% by volume solution of the foaming agent and water and sufficient air to form a consistent air-stable foam is preferably utilized. The valves allowing the foaming solu- and air to flow through the nozzle are left open a sufficient length of time to allow the preformed foam of the type described above to move into the blender 20 in a sufficient quantity to provide a foam-to-slurry ratio of about 1:1 by volume to give a wet density of fifty pounds per cubic foot. The action of the blenders' paddle wheels blends the foam into the slurry to provide a homogeneous casting mixture. Immediately upon the end of the blending cycle, the slide gate 21 is opened and the casting mixture is dumped down the discharge chute 22 into the mold 50. During the discharge step the paddle wheel of the blender is allowed to rotate to aid in discharging the casting mixture. The molded body after it has set to a self-sustaining consistency can then be finished in the conventional manner which includes wire slicing into slabs and curing the slabs in an autoclave at an elevated temperature and pressure.

To illustrate the casual relationship between the pour rate and pour folds, five batches were mixed, all being identical with the previously described specific example, each batch was flowed from the blender at a different rate. The pouring rates were varied by adjusting the opening provided by the slide gate 21 with the exception of the last batch which was pumped from the blender using a conventional Moyno pump. The following is a table of the various batches and their pouring rates:

| Batch No. | Volume, Cubic Feet | Pouring Time, Min. | Pouring, c.f.m. | Rate, g.p.m. |
|---|---|---|---|---|
| 1 | 49.5 | 0.5 | 99.0 | 743 |
| 2 | 56.0 | 1.5 | 37.3 | 280 |
| 3 | 56.0 | 3.0 | 18.7 | 140 |
| 4 | 56.0 | 5.0 | 11.2 | 84 |
| 5 | 49.0 | 7.0 | 7.0 | 53 |

After the molded bodies had hardened to the consistency necessary for handling, each was broken up into small sections and examined very thoroughly and carefully for pour folds. As each fold was discovered, its area was measured. The total area of pour folds for the above batches was as follows:

|  | Sq. in. |
|---|---|
| Batch 1 | 0 |
| Batch 2 | 602 |
| Batch 3 | 2181 |
| Batch 4 | 2041 |
| Batch 5 | 6740 |

The Reynolds number in the channel of flow was determined for each of the batches by using the formula:

$$R = \frac{pVd}{u}$$

where $d$ equals density, $V$ equals velocity, $u$ equals dynamic viscosity and $p$ equals hydraulic radius. The density, velocity and hydraulic radius were calculated by conventional means from the data above and measurements made by the channel of flow, i.e., the trough 22 and the depth of the material in the trough. A representative sample was taken of the foregoing batches and its viscosity measured at the time it was to be poured by means of a Brookfield viscometer, taking into consideration the thixotropic character of the material. From the foregoing, the Reynolds number for each of the batches was found to be as follows:

| Batch No.: | Reynolds No. |
|---|---|
| 1 | 3960 |
| 2 | 707 |
| 3 | 240 |
| 4 | 70 |
| 5 | 520 |

From the foregoing, it can be seen that except for Batch No. 5, which was pumped through a three inch diameter hose, there is a direct correlation between the Reynold's number for a particular batch and the area of pour folds found therein. For Batch No. 1 having a Reynold's number of 3960, no pour folds were found. Turbulent flow as used herein means flow at a sufficient velocity to create substantial lateral or transverse mixing of the flowing material. Turbulent flow begins at a Reynold's number of 2100 and for most cases is complete at a Reynold's number of 4000.

The exact reason for elimination of pour folds is not entirely known, but it is believed that the mixing action provided by turbulent flow prevents or breaks up any skin or gel formations along the stream of flow which would prevent complete blending of the casting mixture and would lead to the formation of pour folds. In making viscosity measurements it was noted that the casting mixture exhibits thixotropic properties, i.e., the viscosity of the material is lowered by mechanical working of the material. It is believed that in conventional discharging techniques which include pumping by means of a Moyno pump, the flow of the material is substantially laminar thereby leading to the formation of pour folds.

I have also discovered that the flow must be continuous and that an interruption in the flow will create a pour fold at that point in the mold body.

It will, of course, be understood that various details of construction may be modified through a wide range without departing from the principles of this invention, and it is not therefore, the purpose to limit the patent granted hereon otherwise than necessitated by the scope of the appended claims.

I claim:

1. A method of casting a cementitious slurry that has been blended with a stabilized foam which comprises, continuously pouring said slurry and foam mixture from said blended condition into a mold at a rate sufficient to cause continuous turbulent flow in the moving mass being poured.

2. A method of casting a cementitious slurry that has been blended with a stabilized foam which comprises, continuously pouring said slurry and foam mixture from said blended condition through a conduit and into a mold at a rate sufficient to create a flow having a Reynold's number over 2100 in said conduit.

3. Method of forming a cellular calcium silicate cast body which comprises mixing cement and a source of powdered silica together with water to form a cementitious slurry, blending said slurry with a stabilized foam to form cellular calcium silicate casting mixture, and continuously, turbulently flowing said mixture through a conduit and into a mold at a rate sufficient to create said continuous turbulent flow in said conduit.

4. A method of casting a cementitious slurry that has been blended with a preformed foam to form a homogeneous casting mix, which comprises, continuously flowing said mix into a mold at a rate sufficient to produce continuous turbulence in said casting mix during flow.

5. In a method of casting a cementitious slurry that has been blended with a stabilized foam,
the step of pouring said blended foam-slurry from said blended condition at a rate, and as a continuously, turbulently moving stream, into a mold, to prevent pour folds in a casting produced therefrom.

References Cited in the file of this patent

UNITED STATES PATENTS

| 2,540,354 | Selden | Feb. 6, 1951 |
| 2,592,345 | Schnell et al. | Apr. 8, 1952 |
| 2,816,321 | Hutchcraft | Dec. 17, 1957 |
| 2,915,802 | Dugas | Dec. 8, 1959 |
| 2,979,801 | Gasmire | Apr. 18, 1961 |